United States Patent
Lehoty et al.

(10) Patent No.: US 7,268,341 B2
(45) Date of Patent: Sep. 11, 2007

(54) OPTICAL POSITION SENSING DEVICE INCLUDING INTERLACED GROUPS OF PHOTOSENSITIVE ELEMENTS

(75) Inventors: David A. Lehoty, Mountain View, CA (US); Charles B. Roxlo, Saratoga, CA (US); Jahja I. Trisnadi, Cupertino, CA (US); Clinton B. Carlisle, Palo Alto, CA (US)

(73) Assignee: Silicon Light Machines Corporation, San Jose, CA (US)

( * ) Notice: Subject to any disclaimer, the term of this patent is extended or adjusted under 35 U.S.C. 154(b) by 260 days.

(21) Appl. No.: 11/123,326

(22) Filed: May 4, 2005

(65) Prior Publication Data

US 2005/0258345 A1    Nov. 24, 2005

Related U.S. Application Data

(60) Provisional application No. 60/573,303, filed on May 21, 2004.

(51) Int. Cl.
G09G 5/08 (2006.01)
(52) U.S. Cl. .............. 250/221; 250/222.1; 345/166
(58) Field of Classification Search ............ 250/221, 250/222.1; 345/165, 166
See application file for complete search history.

(56) References Cited

U.S. PATENT DOCUMENTS

| | | | |
|---|---|---|---|
| 3,922,093 A | 11/1975 | Dandliker et al. | |
| 4,546,347 A | 10/1985 | Kirsch | |
| 4,751,380 A * | 6/1988 | Victor et al. | 250/221 |
| 4,799,055 A | 1/1989 | Nestler et al. | |
| 4,814,553 A * | 3/1989 | Joyce | 250/221 |
| 4,920,260 A * | 4/1990 | Victor et al. | 250/221 |
| 5,288,993 A | 2/1994 | Bidiville et al. | |
| 5,345,527 A | 9/1994 | Lebby et al. | |
| 5,391,868 A * | 2/1995 | Vampola et al. | 250/208.1 |
| 5,473,344 A | 12/1995 | Bacon et al. | |
| 5,578,813 A | 11/1996 | Allen et al. | |
| 5,606,174 A | 2/1997 | Yoshimura et al. | |
| 5,644,139 A | 7/1997 | Allen et al. | |
| D382,550 S | 8/1997 | Kaneko et al. | |
| D385,542 S | 10/1997 | Kaneko et al. | |
| 5,703,356 A | 12/1997 | Bidiville et al. | |

(Continued)

OTHER PUBLICATIONS

R. E. Kalman, "A New Approach to Linear Filtering and Prediction Problems", Transactions of the ASME-Journal of Basic Engineering, 82 (Series D); Copyright 1960, ASME, pp. 35-45, Research Institute for Advanced Study, Baltimore, MD.

*Primary Examiner*—John R. Lee
(74) *Attorney, Agent, or Firm*—Okamoto & Benedicto LLP

(57) ABSTRACT

One embodiment described relates to an optical displacement sensor for sensing movement of a data input device across a surface by detecting displacement of optical features in a succession of images of the surface. The sensor includes a detector having an array including a number (N) of sets of photosensitive elements, each set having a number (M) of photosensitive elements, where M is greater than two and not equal to four. Signals from each of the photosensitive elements in a set are electrically coupled or combined with corresponding photosensitive elements in other sets to produce a total of M independent group signals from M interlaced groups of photosensitive elements. Other embodiments are also described.

20 Claims, 13 Drawing Sheets

U.S. PATENT DOCUMENTS

| | | |
|---|---|---|
| 5,729,008 A | 3/1998 | Blalock et al. |
| 5,729,009 A | 3/1998 | Dandliker et al. |
| 5,781,229 A | 7/1998 | Zediker et al. |
| 5,786,804 A | 7/1998 | Gordon |
| 5,825,044 A | 10/1998 | Allen et al. |
| 5,854,482 A | 12/1998 | Bidiville et al. |
| 5,907,152 A | 5/1999 | Dandliker et al. |
| 5,963,197 A | 10/1999 | Bacon et al. |
| 5,994,710 A | 11/1999 | Knee et al. |
| 6,031,218 A | 2/2000 | Piot et al. |
| 6,037,643 A | 3/2000 | Knee |
| 6,057,540 A | 5/2000 | Gordon et al. |
| 6,097,371 A | 8/2000 | Siddiqui et al. |
| 6,151,015 A | 11/2000 | Badyal et al. |
| 6,172,354 B1 | 1/2001 | Adan et al. |
| 6,225,617 B1 | 5/2001 | Dandliker et al. |
| 6,233,368 B1 | 5/2001 | Badyal et al. |
| 6,281,881 B1 | 8/2001 | Siddiqui et al. |
| 6,281,882 B1 | 8/2001 | Gordon et al. |
| 6,326,950 B1 | 12/2001 | Liu |
| 6,330,057 B1 | 12/2001 | Lederer et al. |
| 6,351,257 B1 | 2/2002 | Liu |
| 6,396,479 B2 | 5/2002 | Gordon |
| 6,421,045 B1 | 7/2002 | Venkat et al. |
| 6,424,407 B1 | 7/2002 | Kinrot et al. |
| 6,433,780 B1 | 8/2002 | Gordon et al. |
| 6,452,683 B1 | 9/2002 | Kinrot et al. |
| 6,455,840 B1 | 9/2002 | Oliver et al. |
| D464,352 S | 10/2002 | Kerestegian |
| 6,462,330 B1 | 10/2002 | Venkat et al. |
| 6,476,970 B1 | 11/2002 | Smith |
| 6,529,184 B1 | 3/2003 | Julienne |
| 6,585,158 B2 | 7/2003 | Norskog |
| 6,603,111 B2 | 8/2003 | Dietz et al. |
| 6,621,483 B2 | 9/2003 | Wallace et al. |
| 6,642,506 B1 | 11/2003 | Nahum et al. |
| 6,657,184 B2 | 12/2003 | Anderson et al. |
| 6,664,948 B2 | 12/2003 | Crane et al. |
| 6,674,475 B1 | 1/2004 | Anderson |
| 6,677,929 B2 | 1/2004 | Gordon et al. |
| 6,703,599 B1 | 3/2004 | Casebolt et al. |
| 6,737,636 B2 | 5/2004 | Dietz et al. |
| 6,774,351 B2 | 8/2004 | Black |
| 6,774,915 B2 | 8/2004 | Rensberger |
| 6,795,056 B2 | 9/2004 | Norskog et al. |
| 6,809,723 B2 | 10/2004 | Davis |
| 6,819,314 B2 | 11/2004 | Black |
| 6,823,077 B2 | 11/2004 | Dietz et al. |
| 7,042,575 B2 * | 5/2006 | Carlisle et al. ............. 345/166 |
| 7,138,620 B2 * | 11/2006 | Trisnadi et al. ............. 250/221 |
| 2002/0130835 A1 | 9/2002 | Brosnan |
| 2002/0158300 A1 | 10/2002 | Gee |
| 2002/0190953 A1 | 12/2002 | Gordon et al. |
| 2003/0034959 A1 | 2/2003 | Davis et al. |
| 2003/0058506 A1 | 3/2003 | Green et al. |
| 2003/0142288 A1 | 7/2003 | Kinrot et al. |
| 2004/0084610 A1 | 5/2004 | Leong et al. |
| 2004/0189593 A1 | 9/2004 | Koay |
| 2005/0024336 A1 | 2/2005 | Xie et al. |
| 2005/0024623 A1 | 2/2005 | Xie et al. |
| 2005/0083303 A1 | 4/2005 | Schroeder et al. |
| 2006/0091301 A1 * | 5/2006 | Trisnadi et al. ............. 250/226 |

* cited by examiner

OPTICAL POSITION SENSING DEVICE INCLUDING INTERLACED GROUPS OF PHOTOSENSITIVE ELEMENTS

CROSS-REFERENCE TO RELATED APPLICATIONS

The present application claims the benefit of U.S. provisional application No. 60/573,303, entitled "Optical position sensing device having a detector including interlaced groups of photosensitive elements," filed May 21, 2004, by inventors David A. LeHoty, Charles B. Roxlo, Jahja I. Trisnadi and Clinton B. Carlisle. The disclosure of the aforementioned U.S. provisional application is hereby incorporated by reference in its entirety.

TECHNICAL FIELD

The present invention relates generally to an Optical Positioning Device (OPD), and methods of sensing movement using the same.

BACKGROUND OF THE INVENTION

Pointing devices, such as computer mice or trackballs, are utilized for inputting data into and interfacing with personal computers and workstations. Such devices allow rapid relocation of a cursor on a monitor, and are useful in many text, database and graphical programs. A user controls the cursor, for example, by moving the mouse over a surface to move the cursor in a direction and over distance proportional to the movement of the mouse. Alternatively, movement of the hand over a stationary device may be used for the same purpose.

Computer mice come in both optical and mechanical versions. Mechanical mice typically use a rotating ball to detect motion, and a pair of shaft encoders in contact with the ball to produce a digital signal used by the computer to move the cursor. One problem with mechanical mice is that they are prone to inaccuracy and malfunction after sustained use due to dirt accumulation, and such. In addition, the movement and resultant wear of the mechanical elements, particularly the shaft encoders, necessarily limit the useful life of the device.

One solution to the above-discussed with mechanical mice problems has been the development of optical mice. Optical mice have become very popular because they are more robust and may provide a better pointing accuracy.

The dominant conventional technology used for optical mice relies on a light emitting diode (LED) illuminating a surface at or near grazing incidence, a two-dimensional CMOS (complementary metal-oxide-semiconductor) detector which captures the resultant images, and software that correlates successive images to determine the direction, distance and speed the mouse has been moved. This technology typically provides high accuracy but suffers from a complex design and relatively high image processing requirements. In addition, the optical efficiency is low due to the grazing incidence of the illumination.

Another approach uses one-dimensional arrays of photo-sensors or detectors, such as photodiodes. Successive images of the surface are captured by imaging optics, translated onto the photodiodes, and compared to detect movement of the mouse. The photodiodes may be directly wired in groups to facilitate motion detection. This reduces the photodiode requirements, and enables rapid analog processing. An example of one such a mouse is disclosed in U.S. Pat. No. 5,907,152 to Dandliker et al.

The mouse disclosed in Dandliker et al. differs from the standard technology also in that it uses a coherent light source, such as a laser. Light from a coherent source scattered off of a rough surface generates a random intensity distribution of light known as speckle. The use of a speckle-based pattern has several advantages, including efficient laser-based light generation and high contrast images even under illumination at normal incidence. This allows for a more efficient system and conserves current consumption, which is advantageous in wireless applications so as to extend battery life.

Although a significant improvement over the conventional LED-based optical mice, these speckle-based devices have not been wholly satisfactory for a number of reasons. In particular, mice using laser speckle have not demonstrated the accuracy typically demanded in state-of-the-art mice today, which generally are desired to have a path error of less than 0.5% or thereabout.

The present disclosure discusses and provides solutions to various problems with prior optical mice and other similar optical pointing devices.

SUMMARY OF THE INVENTION

One aspect of the present disclosure is directed to an optical displacement sensor for sensing movement or transverse displacement of a data input device across a surface by detecting displacement of optical features in a succession of images taken of the surface. In accordance with one embodiment, the sensor includes a detector having an array including a number of sets of photosensitive elements, each set having a number of photosensitive elements, where M is greater than two and not equal to four. Signals from each of the photosensitive elements in a set are electrically coupled or combined with corresponding photosensitive elements in other sets to produce a total of M independent group signals from M interlaced groups of photosensitive elements.

In accordance with another embodiment, the sensor includes a circuit to combine the group signals to generate a line signal from the array. Preferably, the circuit includes weighting circuitry to weight each group signal from the array prior to combining them to generate the line signal. More preferably, each of the group signals is weighted by a primary or in-phase weighting factor (S1) and a quadrature weighting factor (S2) calculated using the following equations:

$$S1 = \cos\left[\frac{2\pi j}{M} + \phi\right] \quad \text{(Equation 1)}$$

and $$S2 = \sin\left[\frac{2\pi j}{M} + \phi\right] \quad \text{(Equation 2)}$$

where j is a number from 0 to M-1 depending upon the group signal being weighted (j spans all photosensitive elements in a group from 0 to M-1), and $\phi$ is a phase which may be common to all weighting factors.

In accordance with another embodiment, the sensor further includes a comparator for comparing magnitudes of line signals from multiple linear comb arrays, and a selector for selecting the line signal having the largest magnitude. Other embodiments of a sensor for sensing relative movement are also disclosed.

Another aspect of the present disclosure is directed to a method for sensing movement of a data input device relative to a surface using an optical displacement sensor having a detector with an array including multiple sets of photosensitive elements, each set having a number (M) of photosensitive elements (M), where M is greater than two and not equal to four (4). In accordance with one embodiment, the method includes: (i) receiving on the array an intensity pattern produced by light reflected from a portion of the surface; and (ii) electrically coupling or combining signals from each of the photosensitive elements in a set with corresponding photosensitive elements in other sets to produce a total of M independent group signals from M interlaced groups of photosensitive elements.

In accordance with another embodiment, the method includes combining the group signals to generate a line signal from the array. Preferably, combining the group signals comprises weighting each group signal prior to combining them to generate the line signal. More preferably, weighting each group signal comprises multiplying each group signal by a primary or in-phase weighting factor (S1) and a quadrature weighting factor (S2).

In accordance with another embodiment, the method further includes: (i) comparing magnitudes of line signals from multiple linear comb arrays (or portions thereof); and (ii) selecting the line signal having the largest magnitude. Other embodiments of sensing relative movement are also disclosed.

BRIEF DESCRIPTION OF THE DRAWINGS

These and various other features and advantages of the present disclosure are understood more fully from the detailed description that follows and from the accompanying drawings, which, however, should not be taken to limit the appended claims to the specific embodiments shown, but are for explanation and understanding only, where:

DETAILED DESCRIPTION

Problems with Prior Optical Positioning Devices

Figure 1A:
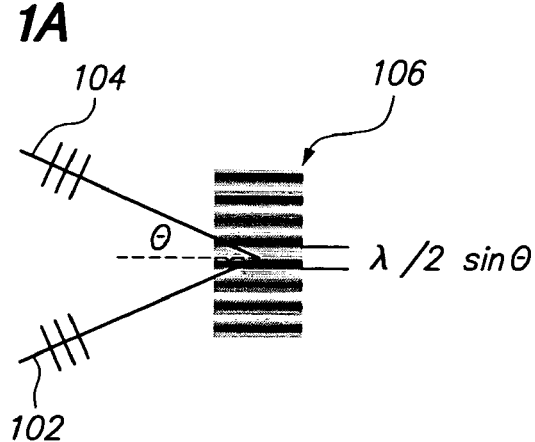
FIGS. 1A and 1B illustrate, respectively, a diffraction pattern of light reflected from a smooth surface and speckle in an interference pattern of light reflected from a rough surface.

One problem with prior speckle-based OPDs stems from the pitch or distance between neighboring photodiodes, which typically ranges from ten (10) micrometers to five hundred (500) micrometers. Speckles in the imaging plane having a size smaller than this pitch are not properly detected, thereby limiting the sensitivity and accuracy of the OPD. Speckles significantly larger than this pitch produce a drastically smaller signal.

Another problem is the coherent light source must be correctly aligned with the detector in order to produce a speckled surface image. With prior designs, the illuminated portion of an image plane is typically much wider than the field of view of the detector to make sure the photodiode array(s) is (are) fully covered by the reflected illumination. However, having a large illuminated area reduces the power intensity of the reflected illumination that the photodiodes can detect. Thus, attempts to solve or avoid misalignment problems in prior speckle-based OPD have frequently resulted in a loss of reflected light available to the photodiode array, or have imposed higher requirements on the illumination power.

Yet another problem with conventional OPDs is the distortion of features on or emanating from the surface due to a viewing angle and/or varying distance between the imaging optics and features at different points within the field of view. This is particularly a problem for OPDs using illumination at grazing incidence.

An additional problem with prior speckle-based OPDs arising from image analysis of the speckle pattern is sensitivity of an estimation scheme to statistical fluctuations. Because speckles are generated through phase randomization of scattered coherent light, the speckles have a defined size and distribution on average, but the speckles may exhibit local patterns not consistent with the average. Therefore, the device can be subject to locally ambiguous or hard to interpret data, such as where the pattern of the speckle provides a smaller motion-dependent signal than usual.

Still another problem with speckle-based OPDs relates to the changing of the speckle pattern, or speckle "boiling". In general, the speckle pattern from a surface moves as the surface is moved, and in the same direction with the same velocity. However, in many optical systems there will be additional changes in the phase front coming off of the surface. For example, if the optical system is not telecentric, so that the path length from the surface to the corresponding detector is not uniform across the surface, the speckle pattern may change in a somewhat random manner as the surface is moved. This distorts the signal used to detect surface motion, leading to decreases in the accuracy and sensitivity of the system.

Accordingly, there is a need for a highly accurate speckle-based optical pointing device and method of using the same that is capable of detecting movement with a path error of less than 0.5% or thereabout. It is desirable that the device have a straightforward and uncomplicated design with relatively low image processing requirements. It is further desirable that the device have a high optical efficiency in which the loss of reflected light available to the photodiode array is minimized. It is still further desirable to optimize the sensitivity and accuracy of the device for the speckle size used, and to maintain the speckle pattern accurately by the optical system.

OPD Embodiments Disclosed Herein

The present disclosure relates generally to a sensor for an Optical Positioning Device (OPD), and to methods for sensing relative movement between the sensor and a surface based on displacement of a random intensity distribution pattern of light, known as speckle, reflected from the surface. OPDs include, but are not limited to, optical mice or trackballs for inputting data to a personal computer.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Generally, the sensor for an OPD includes an illuminator having a light source and illumination optics to illuminate a portion of the surface, a detector having a number of photosensitive elements and imaging optics, and signal processing or mixed-signal electronics for combining signals from each of the photosensitive elements to produce an output signal from the detector.

In one embodiment, the detector and mixed-signal electronics are fabricated using standard CMOS processes and equipment. Preferably, the sensor and method of the present invention provide an optically-efficient detection architecture by use of structured illumination and telecentric speckle-imaging as well as a simplified signal processing configuration using a combination of analog and digital electronics. This architecture reduces the amount of electrical power dedicated to signal processing and displacement-estimation in the sensor. It has been found that a sensor using the speckle-detection technique, and appropriately configured in accordance with the present invention can meet or exceed all performance criteria typically expected of OPDs, including maximum displacement speed, accuracy, and % path error rates.

Introduction to Speckle-Based Displacement Sensors

This section discusses operating principles of speckle-based displacement sensors as understood and believed by the applicants. While these operating principles are useful for purposes of understanding, it is not intended that embodiments of the present disclosure be unnecessarily limited by these principles.

Referring to FIG. 1A, laser light of a wavelength indicated is depicted incident to 102 and reflecting from 104 a smooth reflective surface, where the angle of incidence θ equals the angle of reflectance θ. A diffraction pattern 106 results which has a periodicity of $\lambda/2 \sin \theta$.

Figure 1B:
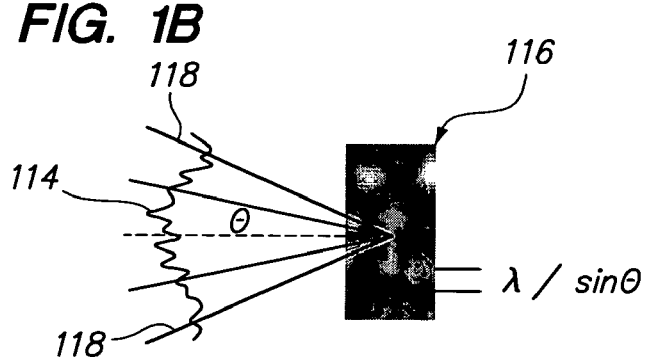

In contrast, referring to FIG. 1B, any general surface with topological irregularities of dimensions greater than the wavelength of light (i.e. roughly >1 μm) will tend to scatter light 114 into a complete hemisphere in approximately a Lambertian fashion. If a coherent light source, such as a laser is used, the spatially coherent, scattered light will create a complex interference pattern 116 upon detection by a square-law detector with finite aperture. This complex interference pattern 116 of light and dark areas is termed speckle. The exact nature and contrast of the speckle pattern 116 depends on the surface roughness, the wavelength of light and its degree of spatial-coherence, and the light-gathering or imaging optics. Although often highly complex, a speckle pattern 116 is distinctly characteristic of a section of any rough surface that is imaged by the optics and, as such, may be utilized to identify a location on the surface as it is displaced transversely to the laser and optics-detector assembly.

Speckle is expected to come in all sizes up to the spatial frequency set by the effective aperture of the optics, conventionally defined in term of its numerical aperture NA=sin θ as shown FIG. 1B. Following Goodman [J. W. Goodman, "Statistical Properties of Laser Speckle Patterns" in "Laser Speckle and Related Phenomena" edited by J. C. Dainty, Topics in Applied Physics volume 9, Springer-Verlag (1984)—in particular, see page 39-40.], the size statistical distribution is expressed in terms of the speckle intensity auto-correlation. The "average" speckle diameter may be defined as $$a = \frac{\lambda}{\sin \theta} = \frac{\lambda}{NA} \quad \text{(Equation 3)}$$

It is interesting to note that the spatial frequency spectral density of the speckle intensity, which by Wiener-Khintchine theorem, is simply the Fourier transform of the intensity auto-correlation. The finest possible speckle, $a_{min}=\lambda/2NA$, is set by the unlikely case where the main contribution comes from the extreme rays 118 of FIG. 1B (i.e. rays at ±θ, and contributions from most "interior" rays interfere destructively. The cut-off spatial frequency is therefore $f_{co}=1/(\lambda/2NA)$ or $2NA/\lambda$.

Note that the numerical aperture may be different for spatial frequencies in the image along one dimension (say "x") than along the orthogonal dimension ("y"). This may be caused, for instance, by an optical aperture which is longer in one dimension than another (for example, an ellipse instead of a circle), or by anamorphic lenses. In these cases, the speckle pattern 116 will also be anisotropic, and the average speckle size will be different in the two dimensions.

One advantage of a laser speckle-based displacement sensor is that it can operate with illumination light that arrives at near-normal incidence angles. Sensors that employ imaging optics and incoherent light arriving at grazing incident angles to a rough surface also can be employed for transverse displacement sensing. However, since the grazing incidence angle of the illumination is used to create appropriately large bright-dark shadows of the surface terrain in the image, the system is inherently optically inefficient, as a significant fraction of the light is reflected off in a specular manner away from the detector and thus contributes nothing to the image formed. In contrast, a speckle-based displacement sensor can make efficient use of a larger fraction of the illumination light from the laser source, thereby allowing the development of an optically efficient displacement sensor.

Disclosed Architecture for Speckle-Based Displacement Sensor

The detailed description below describes an architecture for one such laser-speckle-based displacement sensor using CMOS photodiodes with analog signal combining circuitry, moderate amounts of digital signal processing circuitry, and a low-power light source, such as, for example, a 850 nm Vertical Cavity Surface Emitting Laser (VCSEL). While certain implementational details are discussed in the detailed description below, it will be appreciated by those skilled in the art that different light sources, detector or photosensitive elements, and/or different circuitry for combining signals may be utilized without departing from the spirit and scope of the present invention.

A speckle-based mouse according to an embodiment of the present invention will now be described with reference to FIGS. 2 and 3.

Figure 2:
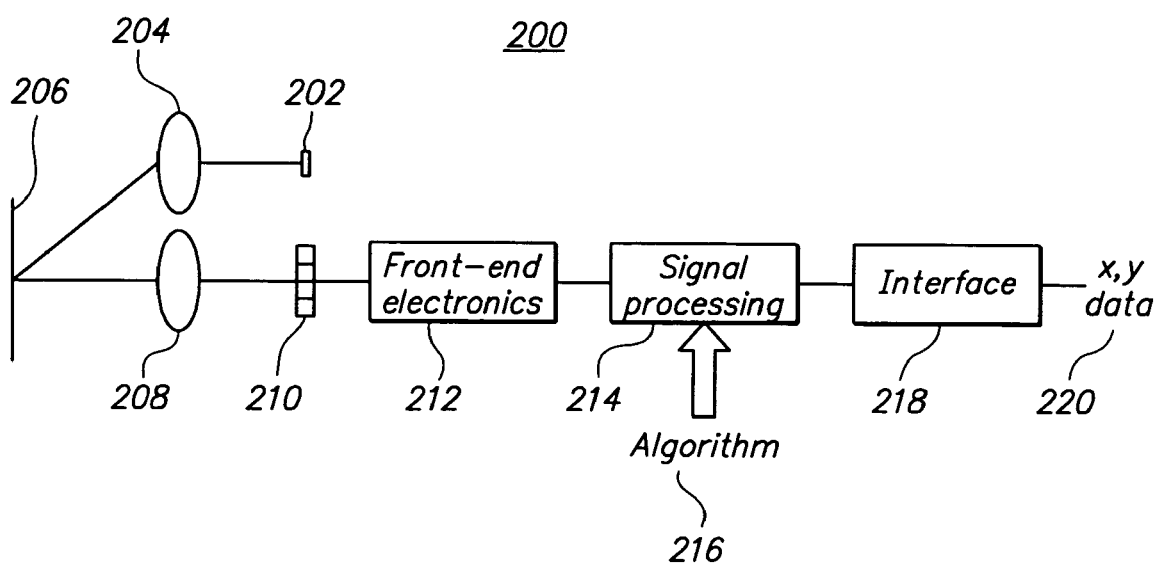
FIG. 2 is a functional block diagram of a speckle-based OPD according to an embodiment of the present disclosure.

FIG. 2 is functional diagram of a speckle-based system 200 according to an embodiment of the invention. The system 200 includes a laser source 202, illumination optics 204, imaging optics 208, at least two sets of multiple CMOS photodiode arrays 210, front-end electronics 212, signal processing circuitry 214, and interface circuitry 216. The photodiode arrays 210 may be configured to provide displacement measurements along two orthogonal axes, x and y. Groups of the photodiodes in each array may be combined using passive electronic components in the front-end electronics 212 to produce group signals. The group signals may be subsequently algebraically combined by the signal processing circuitry 214 to produce an (x, y) signal providing information on the magnitude and direction of displacement of the OPD in x and y directions. The (x,y) signal may be converted by the interface circuitry 218 to x,y data 220 which may be output by the OPD. Sensors using this detection technique may have arrays of interlaced groups of linear photodiodes known as "differential comb arrays."

Figure 3:
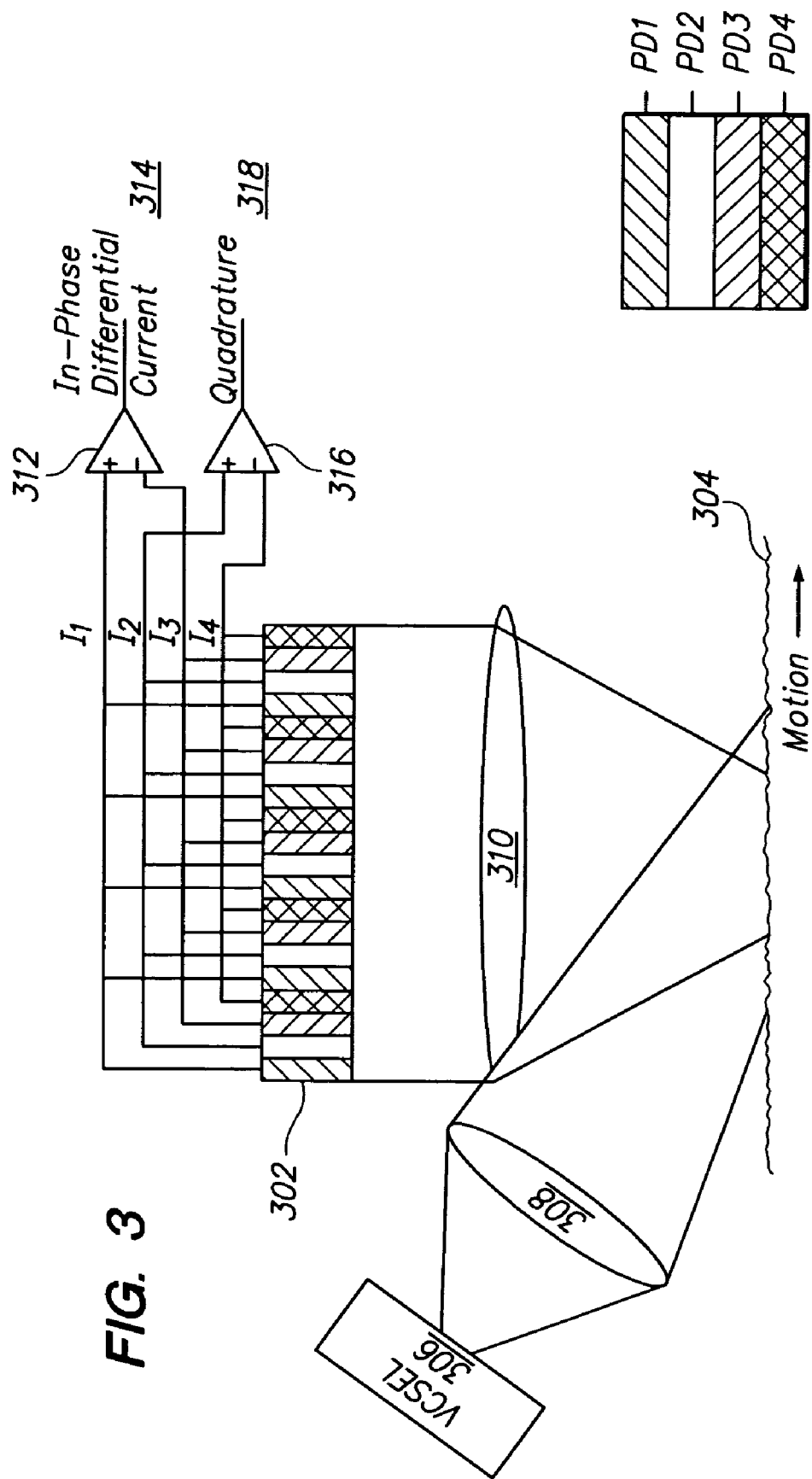
FIG. 3 is a block diagram of an array having interlaced groups of photosensitive elements according to an embodiment of the present disclosure.

FIG. 3 shows a general configuration (along one axis) of such a photodiode array 302, wherein the surface 304 is illuminated by a coherent light source, such as a Vertical Cavity Surface Emitting Laser (VCSEL) 306 and illumination optics 308, and wherein the combination of interlaced groups in the array 302 serves as a periodic filter on spatial frequencies of light-dark signals produced by the speckle images.

Speckle from the rough surface 304 is imaged to the detector plane with imaging optics 310. Preferably, the imaging optics 310 are telecentric for optimum performance.

In one embodiment, the comb array detection is performed in two independent, orthogonal arrays to obtain estimations of displacements in x and y. A small version of one such array 302 is depicted in FIG. 3.

Each array in the detector consists of a number, N, of photodiode sets, each set having a number, M, of photodiodes (PD) arranged to form an MN linear array. In the embodiment shown in FIG. 3, each set consists of four photodiodes (4 PD) referred to as 1,2,3,4. The PD1s from every set are electrically connected (wired sum) to form a group, likewise PD2$s$, PD3$s$, and PD4$s$, giving four signal lines coming out from the array. Their corresponding currents or signals are $I_1$, $I_2$, $I_3$, and $I_4$. These signals ($I_1$, $I_2$, $I_3$, and $I_4$) may be called group signals. Background suppression (and signal accentuation) is accomplished by using differential analog circuitry 312 to generate an in-phase differential current signal 314 ($I_{13}$)=$I_1$-$I_3$ and differential analog circuitry 316 to generate a quadrature differential current signal 318 ($I_{24}$)=$I_2$-$I_4$. These in-phase and quadrature signals may be called line signals. Comparing the phase of $I_{13}$ and $I_{24}$ permits detection of the direction of motion.

Figure 4:
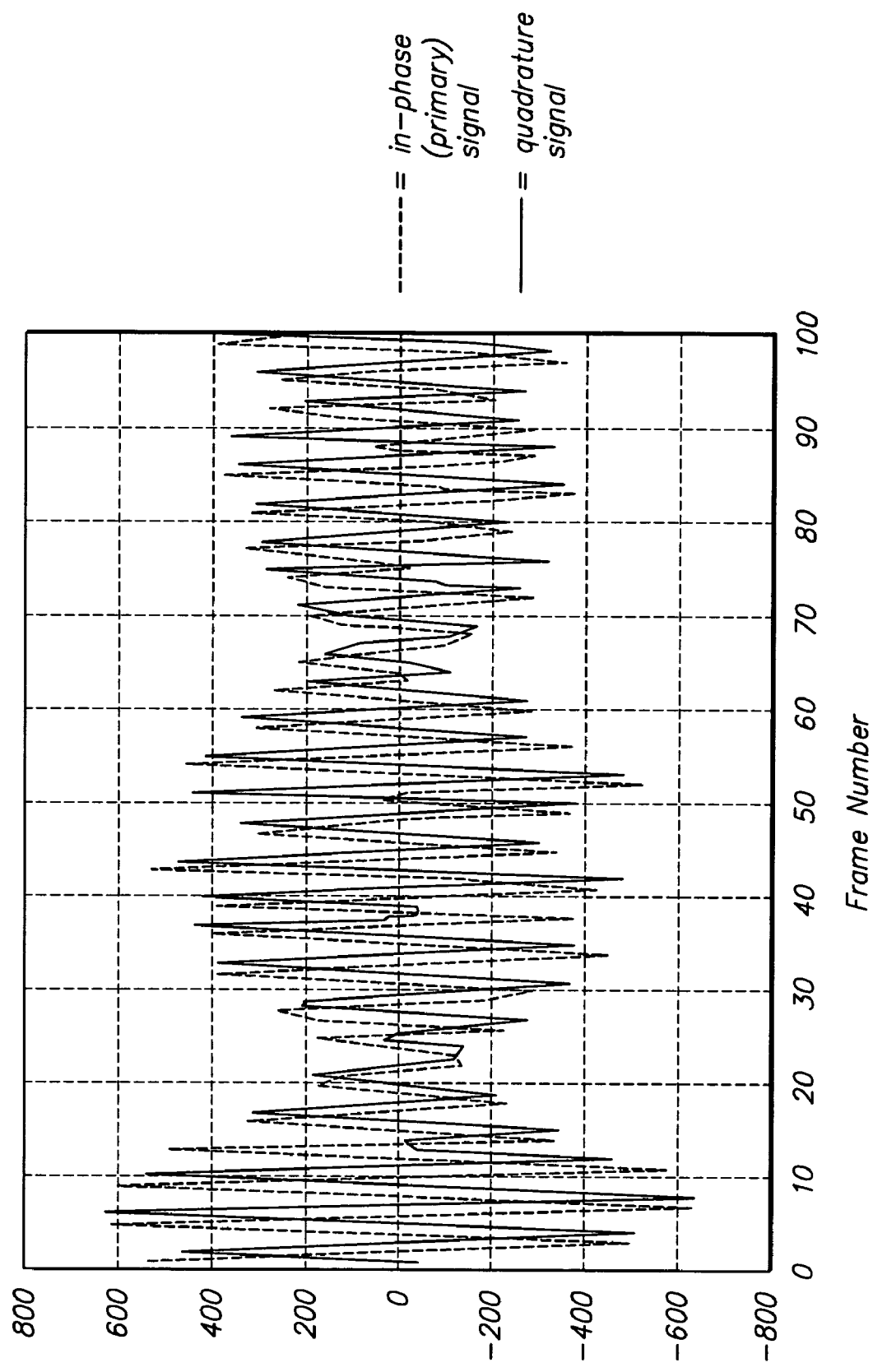
FIG. 4 is a graph of a simulated signal from the array of FIG. 3 according to an embodiment of the present disclosure.

One difficulty with comb detectors using 4N detection, as shown in FIG. 3, is that they may have unacceptably large error rates unless they have a very large array, for example, with more than several hundred detectors or photodiodes in the array 102. These errors arise when the oscillatory signal is weak due to an effective balance between the light intensity falling on different sections of the array. The magnitude of the oscillatory signal is relatively small in and around, for example, frame 65 of the simulation in FIG. 4. Referring to FIG. 4, the in-phase (primary) signal and the quadrature signal are shown. The frame number is shown along the horizontal axis.

Multi-Row Detector Arrays

One solution to this fundamental noise source is to gang or arrange several rows of these detector or photosensitive elements together. A detector with two ganged rows 502-1 and 502-2 is depicted schematically in FIG. 5. Resultant oscillatory in-phase signals 504-1 and 504-2 from the rows are also shown. In such a detector, when one row is producing a weak signal, the velocity can be measured from the signal from the other row. For example, near frame 2400, the in-phase signal 504-1 has a relatively small magnitude, but the second in-phase signal 504-2 has a relatively large magnitude. As we will show below, the error rate is smaller when the magnitude of the oscillations is larger. Therefore, the "right" row (i.e. one with a relatively large magnitude oscillation) can be selected and low-error estimations made.

Simulation Methods

Figure 5:
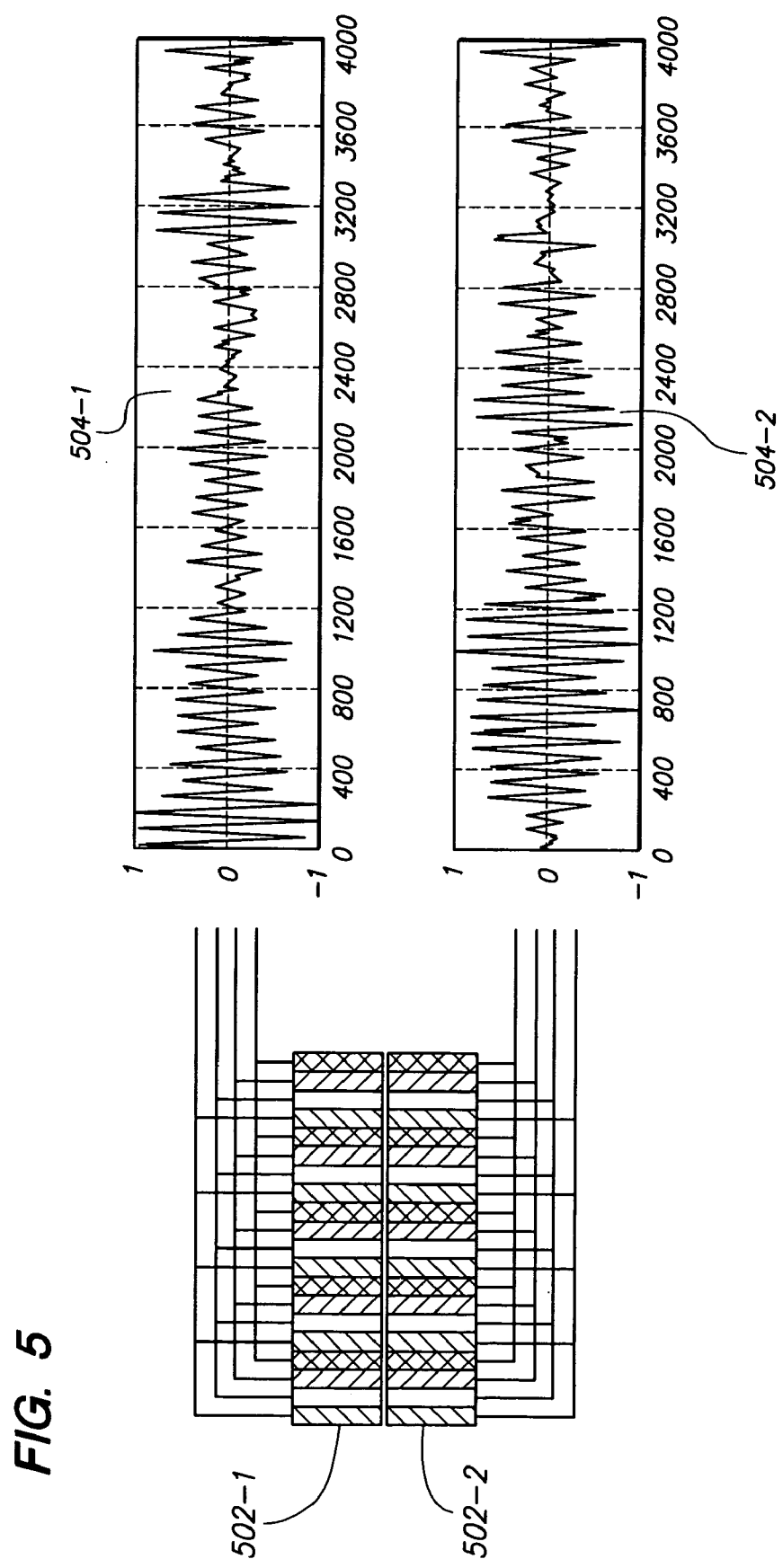
FIG. 5 is a block diagram of an arrangement of an array having multiple rows of interlaced groups of photosensitive elements and resultant in-phase signals according to an embodiment of the present disclosure.

To demonstrate the efficacy of the configuration of FIG. 5, a speckle pattern was generated on a square grid, with random and independent values of intensity in each square. The speckle size, or grid pitch, was set at 20 microns. Another grid, representing the detector array, was generated with variable dimensions and scanned across the speckle pattern at constant velocity. The instantaneous intensity across each detector or photosensitive element was summed with other photocurrents in the same group to determine the signals. The simulations below used a "4N" detector scheme with a constant horizontal detector or photosensitive element pitch.

Error Rate Calculations

Figure 6:
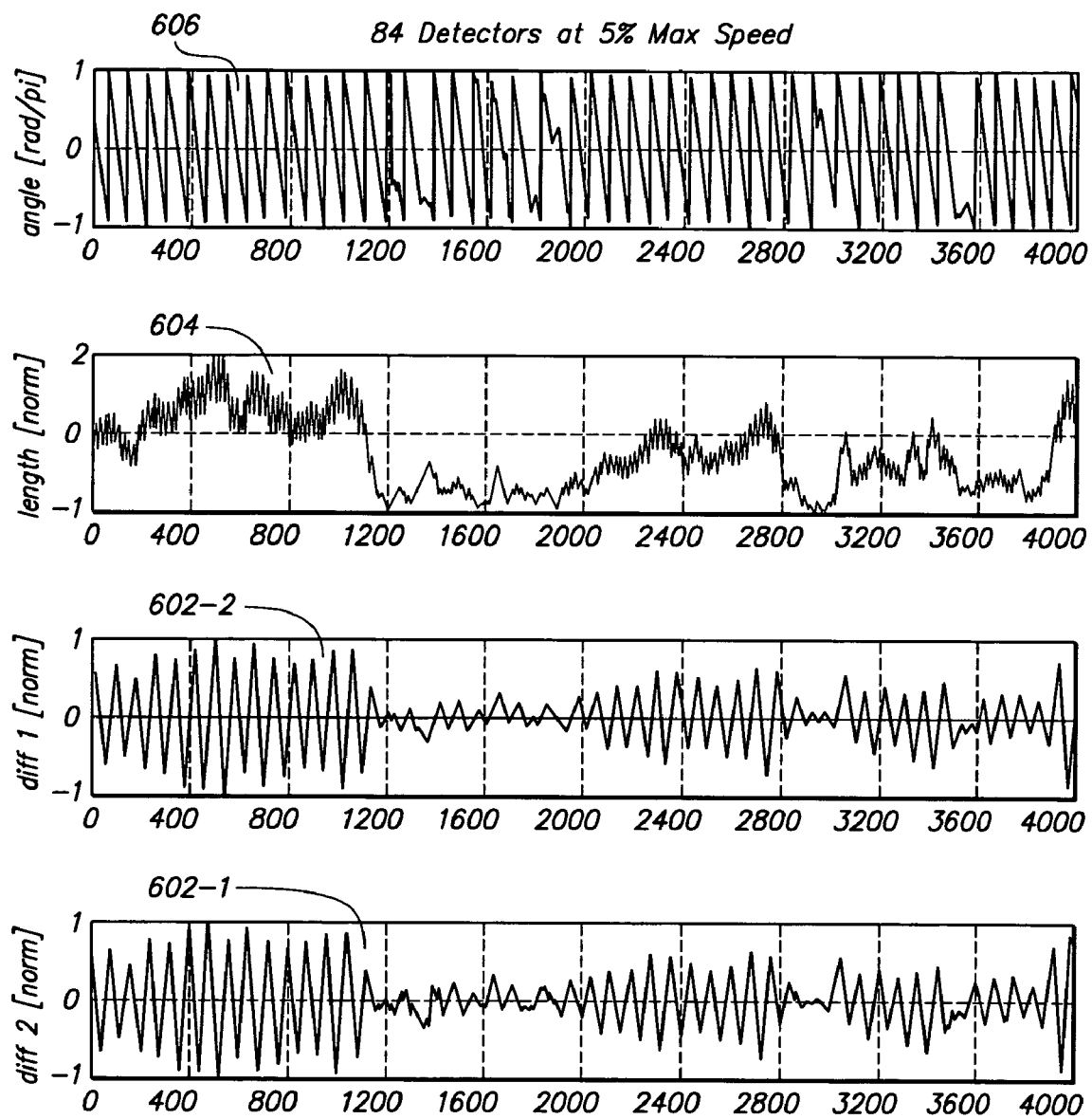
FIG. 6 are graphs of simulated signals from an array having interlaced groups of photosensitive elements wherein signals from each fourth photosensitive elements are electrically coupled or combined according to an embodiment of the present disclosure.

An example output from these simulations is shown in FIG. 6, where simulated in-phase (primary) signals 602-1 and quadrature signals 602-2 from a 4N comb detector are shown. The magnitude (length) 604 and phase (angle) 606 of the vector defined by these two signals is also shown. In this exemplary simulation, each array included 84 detector or photosensitive elements operating at 5% of the maximum speed.

The horizontal axis on these graphs show the frame count; 4000 individual measurements (frames) were used in this case. The lower two curves are the in-phase 602-1 and quadrature 602-2 signals (group 1 minus group 3, and 2 minus 4 respectively). From these two curves a signal length 604 and angle 606 can be determined, as shown in the upper two curves. Note that the in-phase 602-1 and quadrature 602-2 signals are very similar, as they rely on the same section of the speckle pattern.

This data can be used to calculate velocity. In this example, we use a simple zero-crossing algorithm for the velocity calculation. At each frame, the number of frames r between the previous two positive-going zero crossings is calculated. A positive-going zero crossing is a zero crossing where the slope of the line is positive such that the signal is going from a negative value to a positive value. In this case, τ represents an estimate of the number of frames required to travel 20 microns (μm). Consider the frame rate (frames per unit time) to be f and the detector pitch (distance from the start of one group of elements to a next group of elements) to be p. The estimated velocity (speed) v is then $$v = f * p / \tau \qquad \text{(Equation 4)}$$

The maximum velocity $v_{max}$ is half of the Nyquist velocity. A histogram of the result is shown in FIG. 7.

Figure 7:
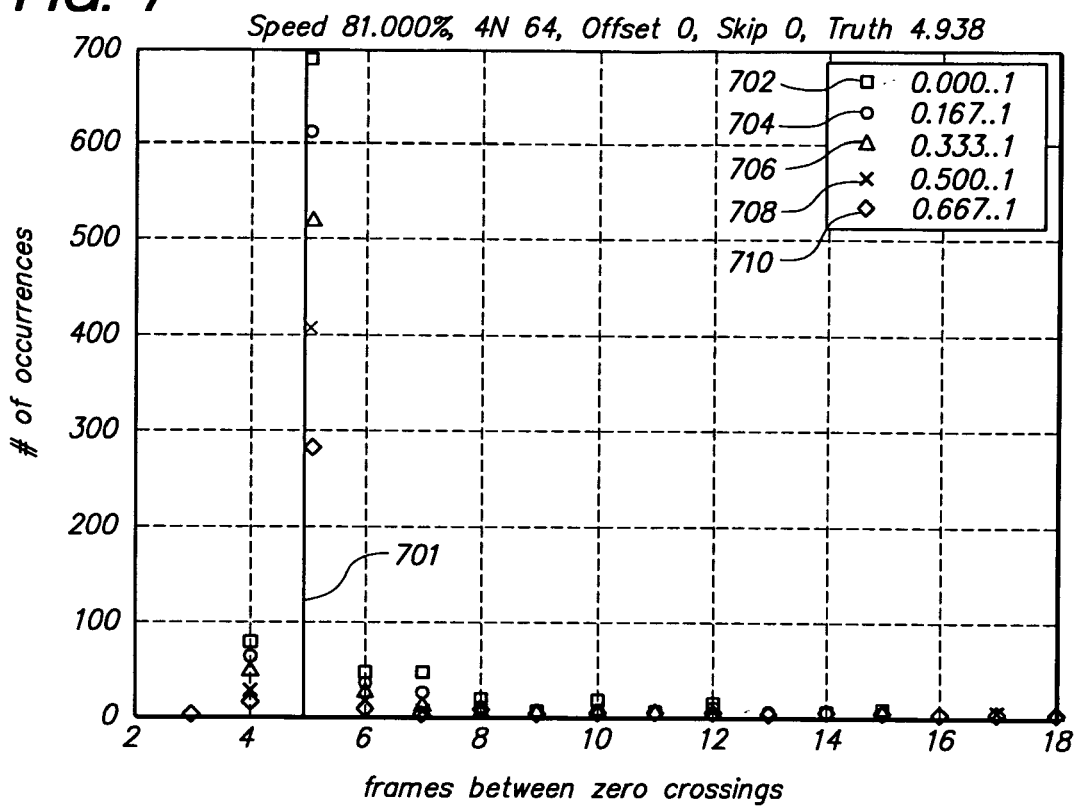
FIG. 7 is a histogram of the estimated velocities for a detector having sixty-four photosensitive elements, coupled in a 4N configuration, and operating at 81% of maximum velocity, according to an embodiment of the present disclosure.

Referring to FIG. 7, the histogram show estimated velocities for a 64 photosensitive element detector, 4N detector operating at 81% of maximum velocity. The vertical line 701 at 4.938 frames represents the actual velocity as estimated from the data. The different point markers in the histogram are for different selections of the dataset: a first marker 702 indicates the number of occurrences when all frames are included; a second marker 704 indicates the number of occurrences when those frames in the bottom 17% of the magnitude distribution are excluded; a third marker 706 indicates the number of occurrences when those frames in the bottom 33% of the magnitude distribution are excluded; a fourth marker 708 indicates the number of occurrences when those frames in the bottom 50% of the magnitude distribution are excluded; and a fifth marker 710 indicates the number of occurrences when those frames in the bottom 67% of the magnitude distribution are excluded.

The points of the first marker 702, containing all of the data, shows a strong peak at 5 frames and a distribution which decreases quickly to both sides. The vertical line 701 at 4.938 frames, which we call "truth", is the actual velocity as estimated. There are two relatively strongest peaks in the data to each side of that line (i.e. at 4 frames and 5 frames).

For the purposes of this simulation we count as an error any point which falls outside of those two strongest peaks. In other words, an estimate which is more than one frame from "truth" is defined to be in "error." This is a fairly strict definition of error, because often such an error will be made up in subsequent cycles. If the actual velocity lies close to an integral number of frames; there will be a significant fraction of errors which lie only a little more than one frame from "truth". For example, the points at 6 frames in FIG. 7 are just slightly more than one frame from the estimated "truth" of 4.938 frames. These points at 6 frames would be considered in "error" under this fairly strict definition.

Figure 8:
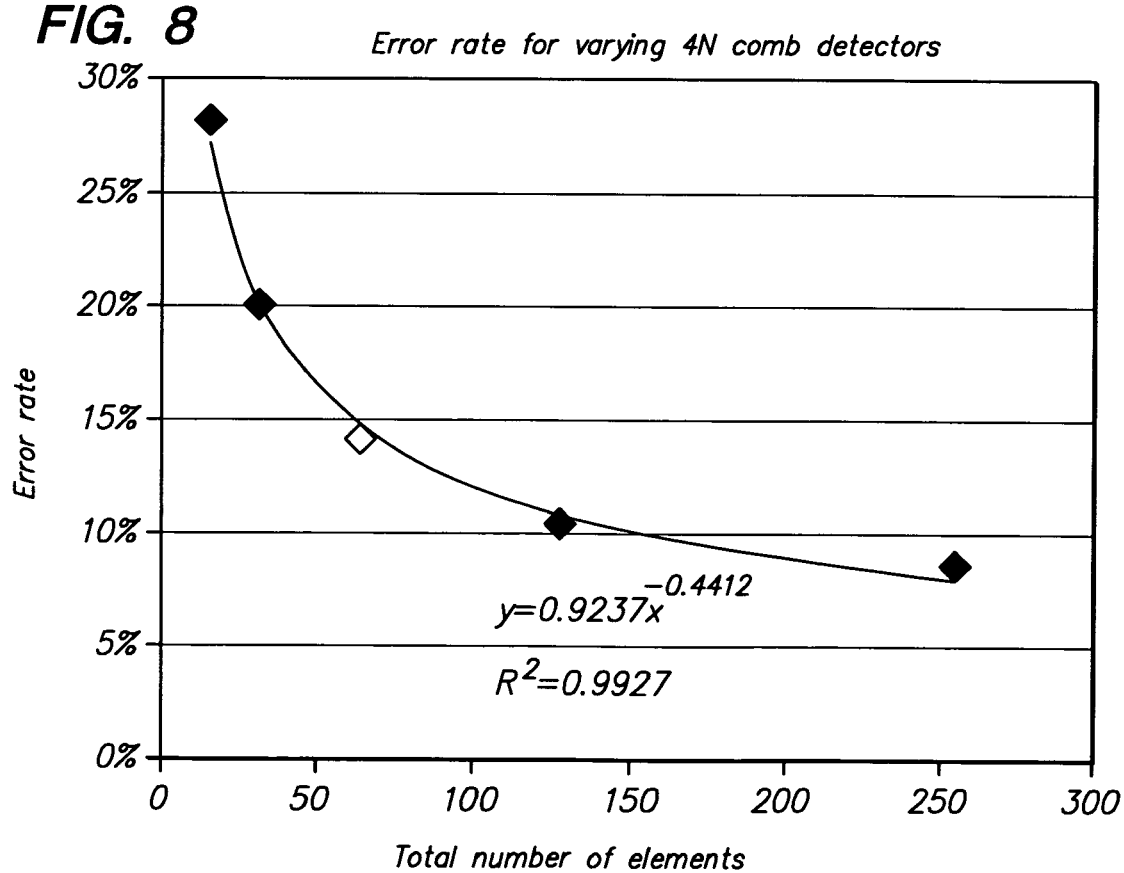
FIG. 8 is a graph showing error rate as a function of number of elements for a detector having photosensitive elements coupled in a 4N configuration according to an embodiment of the present disclosure.

FIG. 8 shows error rate as a function of number of elements in a 4N detector. Referring to FIG. 8, it is seen that the error rate decreases with increasing number of detector or photosensitive elements, as expected from previous work. For these measurements error rates were calculated for seven (7) different velocities and averaged.

Dependence on Vector Length

Errors are concentrated in those frames which have weak signals. The data in FIG. 7 also shows the histogram of the data after selection for vector magnitude. For instance, the points of the third marker 706 are the estimates of velocity for only those frames which have a vector length in the top two-thirds of the distribution (i.e. excluding the bottom 33% based on signal magnitude or signal vector length). So this data excludes those frames where the signal is weak and expected to be error prone. As expected, the distribution of the number of frames between zero crossings is narrower when smaller signal magnitudes are excluded, and the error rate thus calculated is significantly improved.

Figure 9:
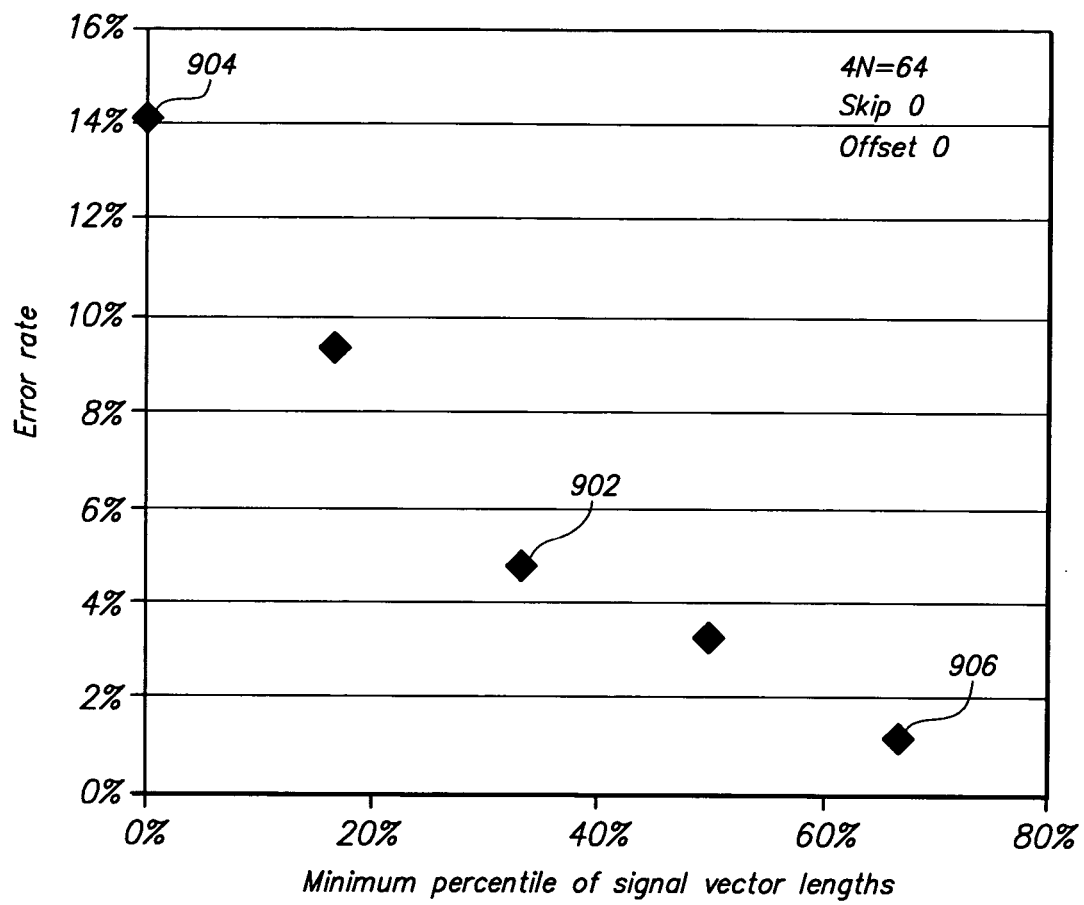
FIG. 9 is a graph showing the dependence of error rate on signal magnitude according to an embodiment of the present disclosure.

The improvement in error rate by excluding smaller signal magnitudes is shown in FIG. 9. FIG. 9 shows the dependence of error rate on signal magnitude. More specifically, the error rate is shown versus the minimum percentile of signal vector lengths used. Referring to FIG. 9, it is seen that the top two-thirds of the vector length distribution (represented by data point 902) has an error rate which is only one-third of that for all frames (represented by data point 904): 4.8% vs. 14.1%. Using only the top third (represented by data point 906) reduces the error rate further to 1.2%.

Thus, based on the improvement in error rate when smaller signal magnitudes are excluded, one scheme of row selection from amongst multiple rows of a detector is to select the row with the highest signal magnitude. For example, in the case of FIG. 5 with two ganged rows, the signals from the second row 504-2 would be selected for frame 2400 because the larger magnitude at that point, while the signals from the first row 504-1 would be selected for frame 3200 because of the larger magnitude at that point. Of course, this selection scheme may be applied to more than two rows. Moreover, instead of using the signal magnitude (AC intensity) as the measure of line signal quality, other quality measures or indicators may be utilized.

Selecting the line signal from the row with the highest line signal quality is one scheme for utilizing signals from multiple rows to avoid or resist speckle fading. In addition, there are various other alternative schemes that accomplish the same or similar aim.

An alternative scheme would be to weight the line signals from different rows according to their magnitude (or other quality measure) and then average the weighted signals, for instance. In one embodiment, rather than simply averaging the weighted signals, the weighted set of signals may be more optimally processed by an algorithm employing recursive filtering techniques. One notable example of a linear recursive filtering technique uses a Kalman filter. [See R. E. Kalman, "A New Approach to Linear Filtering and Prediction Problems," Trans. ASME, *Journal of Basic Engineering*, Volume 82 (Series D), pages 35-45 (1960).] An extended Kalman filter may be utilized for non-linear estimation algorithms (such as the case of sinusoidal signals from the comb detector arrangement). The nature of the signal and measurement models for a speckle-based optical mouse indicate that a recursive digital signal processing algorithm is well-suited to the weighted signals produced by the speckle-mouse front-end detector and electronics.

Simulation of Multi-Row Arrangements

Detectors of two and three rows were simulated using the same techniques. Each row was illuminated by an independent part of the speckle pattern. The results for error rate are shown in FIG. 10.

Figure 10:
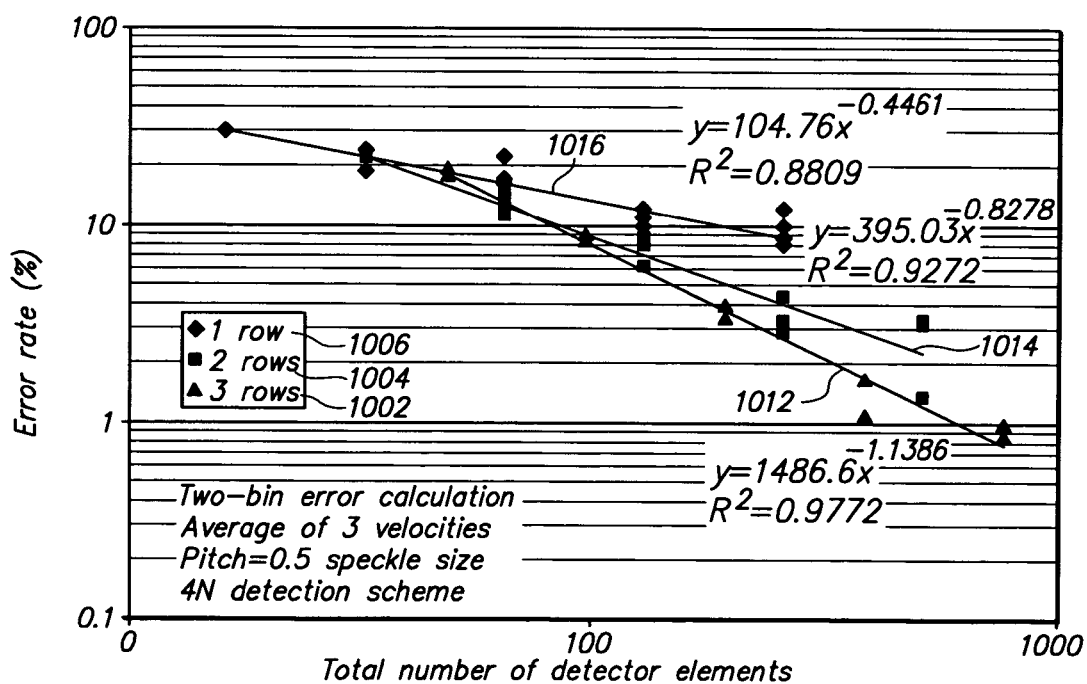
FIG. 10 is a graph showing error rate as a function of the number of elements for a detector having multiple rows of photosensitive elements coupled in a 4N configuration according to embodiments of the present disclosure.

FIG. 10 shows error rates for motion detectors with three (3) rows of 4N detectors 1002, with two (2) rows of 4N detectors 1004, and with one (1) row of 4N detectors 1006. Trend lines are also shown for the 3-row data 1012, 2-row data 1014, and 1-row data 1016. These error rates were calculated by averaging the results at three (3) different velocities over five thousand (5000) frames. The multiple points on the graph represent different simulations: we used four different rows for the 1-row measurements; three different combinations of two rows for the 2-row measurements; and two different combinations of three rows for the 3-row measurements. To ensure a fair comparison, the two- and three-row data were made by combining the original four rows.

The simulation shows, for example, that a single row of 32 elements has an error rate slightly more than 20%. Combining two of those rows (for a total element count of 64) reduces the error rate to about 13%. This is slightly lower than the result for a single row of 64 elements. Combining three of those rows (for a total element count of 96) gives an error rate of about 8%, a reduction to less than ½ of the single-row error rate.

The benefit of increasing the number of rows is greater for a higher number of elements. Combining three rows of 128 elements (for a total element count of 384) reduces the error rate from 10% (for a single row of 128 elements) to 1.5% (for the combination of three of those rows), a reduction to less than ⅙ of the single-row error rate.

Path Error

We can calculate the path error from this error rate as follows. When traversing a path which is M counts long, the total number of errors is ME. Here, E is the error rate discussed and calculated above. As the surface is moved, the errors appear as extra counts and missed counts. For measurements over a longer distance, these errors tend to cancel out and the average net error increases only as the square root of the total number of errors. The measured number of counts differs from the expected counts by an amount which could be positive or negative, but on average it has an absolute value equal to the square root of the number of errors. We define the path error as $$\text{Path\_error} = \left|1 - \frac{\text{Measured\_counts}}{\text{Expected\_counts}}\right| \quad \text{(Equation 5)}$$

When traversing a path which is M counts long, the mouse will generate, on average, ME errors and end up off by $\sqrt{ME}$ counts. So in the case where the measured counts are higher than the expected counts, Measured_counts=M+$\sqrt{ME}$, and the path error is $$\text{Path\_error} = \left|1 - \frac{M + \sqrt{ME}}{M}\right| = \sqrt{\frac{E}{M}} \quad \text{(Equation 6)}$$

This is only a rough statement of the average path error, which in a more accurate calculation would have a distribution centered around zero having a standard deviation of $\sqrt{E/M}$.

To apply this formula to the results presented above, we assume a resolution of 847 dots-per-inch (dpi) (i.e. 847 frames or samples per inch) and a distance traveled of 2 centimeters (cm). This yields 667 frames per measurement (i.e. 667 frames in traveling 2 cm), and so M=667. For 3 rows of 128 detector or photosensitive elements, we have an error rate E of 1.5%, and so a path error of 0.5% in accordance with Equation 6. The path error would improve considerably at longer distances.

Detection Using Ganged Combinations of Detectors or Photosensitive Elements

Another solution to the noise problem of comb detectors using 4N detection is to provide a detector having an array including one or more rows with a number of sets of interlaced groups (N) of photosensitive elements, each set having a number of consecutive photosensitive elements (M), where M is not equal to four (4). In other words, M is a number from a set consisting of 3, 5, 6, 7, 8, 9, 10, and so on. In particular, every third, every fifth, every sixth, or every Mth detector or photosensitive element is combined to generate an independent signal for estimating motion.

Figure 11:
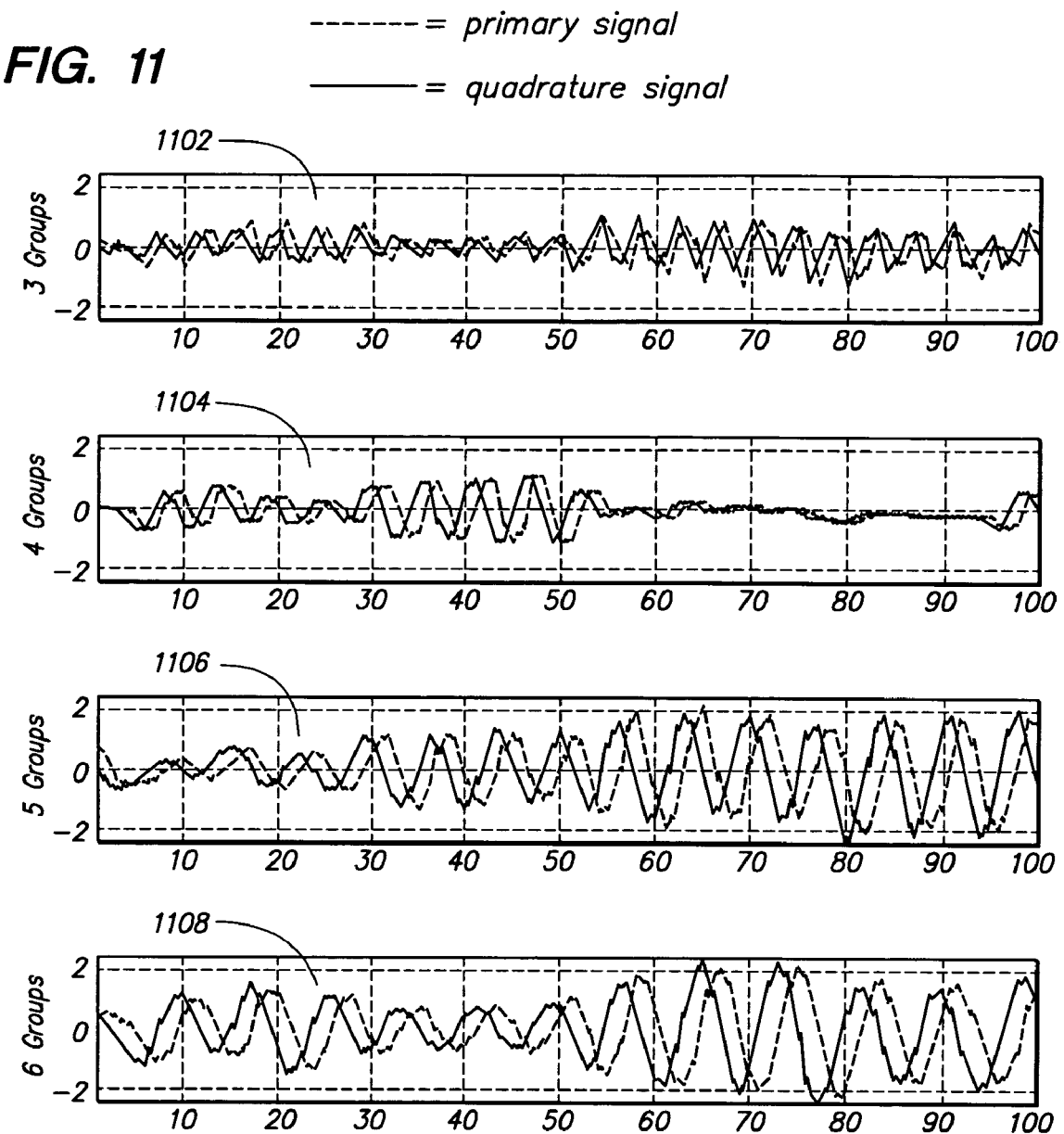
FIG. 11 are graphs showing simulated signals from an array having interlaced groups of photosensitive elements coupled in various configurations according to embodiments of the present disclosure.

FIG. 11 shows the primary and quadrature signals for combining every third 1102, every fourth 1104, every fifth 1108 and every sixth 1110 detector or photosensitive element and operating on the same detection intensities. The signals shown in FIG. 11 are simulated signals from an array having interlaced groups of photosensitive elements or detectors in which raw detections from every third, fourth, fifth and sixth detector or photosensitive element are combined. Referring to FIG. 11, both the primary signal and the quadrature signal are shown, and the frame number is given along the horizontal axis. As can be seen from the graphs of FIG. 11, when one grouping of detectors or photosensitive elements is producing a weak signal, the velocity can be measured using another grouping. As noted above, the error rate is smaller when the magnitude of the oscillation is larger. Therefore, the 'right' (larger magnitude) signal can be selected and low-error estimations made.

The above example includes one-hundred-twenty (120) detector or photosensitive elements operating at about 72% of a maximum rated speed. The horizontal axis on the graphs of FIG. 11 shows frame count. Note that the primary or in-phase and the quadrature signals are very similar, as they rely on or are generated by the same speckle pattern.

As noted previously, this data can be used to calculate velocity. In this case we use a simple zero-crossing algorithm. At each frame the number of frames, τ, between the previous two positive going zero crossing is calculated. This represents an estimate of the number of frames required to travel 20 micrometers. Consider the frame rate (frames per unit time) to be f and the detector pitch (distance from the start of one group of elements to a next group of elements) to be p. The estimated velocity v is then $$v = f \ast p / \tau \quad \text{(Equation 4)}$$

This velocity is the component of the total velocity which lies along the long axis of the detector array.

In order to generate the velocity dependent signals, for configurations other than 4N, the groups of detector or photosensitive elements are weighted and combined. One embodiment of suitable weighting factors is given by the following equations:

$$S1(i) = \cos\left(\frac{2*pi*i}{M} + phi\right) \quad \text{(Equation 1)}$$

and $$S2(i) = \sin\left(\frac{2*pi*i}{M} + phi\right) \quad \text{(Equation 2)}$$

where i spans all photosensitive elements in a set from 0 to M-1. Here phi is a phase shift which is common to all weighting factors.

The in-phase weighted summation of the output signals (i.e. the in-phase signal) is given by the following:

$$InphaseSum(t) = \sum_{i=0}^{M-1} S1(i) * DetectorOutput(i, t) \quad \text{(Equation 7)}$$

while the quadrature weighted summation of the output signals (i.e. the quadrature signal) is given by the following:

$$QuadratureSum(t) = \sum_{i=0}^{M-1} S2(i) * DetectorOutput(i, t) \quad \text{(Equation 8)}$$

Figure 12:
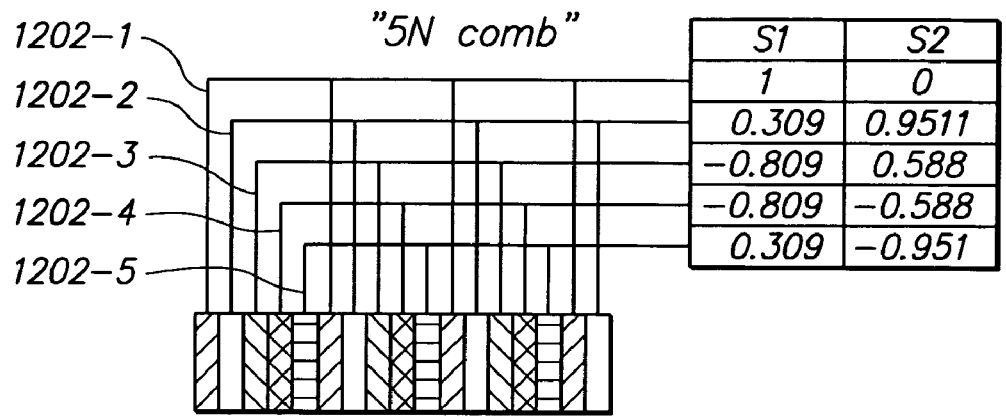
FIG. 12 is a block diagram of an arrangement of an array having photosensitive elements coupled in a 5N configuration and primary and quadrature weighting factors according to an embodiment of the present disclosure.

For 5-element groups, that is for a 5N configuration, those factors are shown in FIG. 12. For this example, five wired sums (1202-1, 1202-2, 1202-3, 1202-4, 1202-5) are formed. The primary signal is the summation of each wired sum multiplied by its primary weight, where the primary weight for each wired sum is given by the S1 column in FIG. 12. Similarly, the quadrature signal is the summation of each wired sum multiplied by its quadrature weight, where the quadrature weight for each wired sum is given by the S2 column in FIG. 12.

Figure 13:
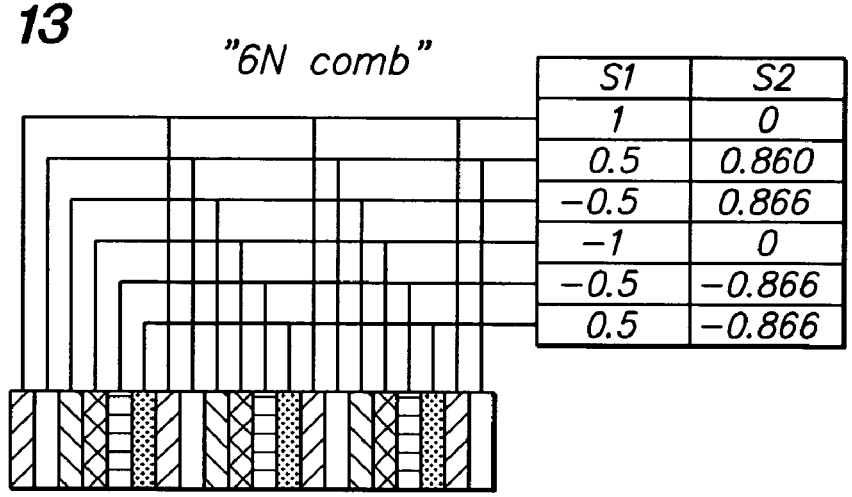
FIG. 13 is a block diagram of an arrangement of an array having photosensitive elements coupled in a 6N configuration and primary and quadrature weighting factors according to an embodiment of the present disclosure.

Weighting factors for an array having photosensitive elements coupled in 6N configuration are shown in FIG. 13. The primary weight factors corresponding to the six wired sums are given under the S1 column, and the quadrature weight factors corresponding to the six wired sums given under the S2 column.

Figure 14:
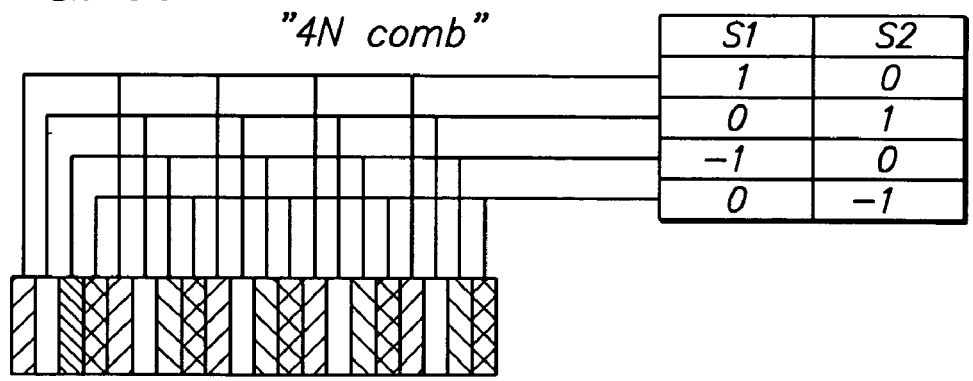
FIG. 14 is a block diagram of an arrangement of an array having photosensitive elements coupled in a 4N configuration and primary and quadrature weighting factors according to an embodiment of the present disclosure.

Weighting factors for an array having photosensitive elements coupled in 4N configuration are shown in FIG. 14. The primary weight factors corresponding to the four wired sums are given under the S1 column, and the quadrature weight factors corresponding to the four wired sums given under the S2 column. For a 4N comb, the weighting factors are all 0 or +/-1, and the system can be reduced to differential amplifiers as shown in FIG. 3 and discussed above in relation thereto.

In another aspect, the present disclosure is directed to a sensor having a detector with two or more different groupings of photosensitive elements. Such an embodiment with multiple groupings of elements allows the generation of multiple independent signals for motion estimation.

Figure 15:
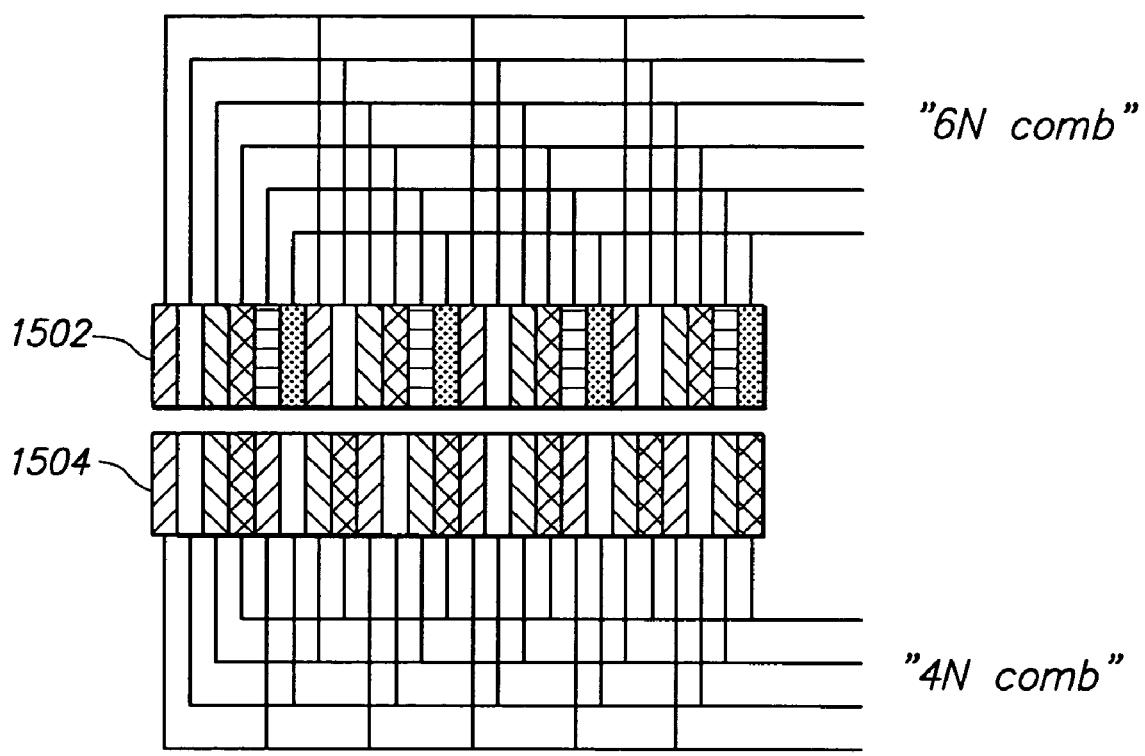
FIG. 15 is a block diagram of an arrangement of a multi-row array having photosensitive elements coupled in a 6N configuration and in a 4N configuration according to an embodiment of the present disclosure.

For example, if combs with different M values are combined in the same sensor (say 4N and 6N), and the width of the photosensitive element is kept constant, we can get good performance from an arrangement like that shown in FIG. 15, with distinct but parallel arrays. FIG. 15 is a block diagram of an arrangement of a two-row array having photosensitive elements coupled in 6N configuration 1502 and in 4N configuration 1504 according to an embodiment of the present invention. In this case, two different speckle patterns are measured, one by each row.

Alternatively, we can use the same arrays and the same sections of the speckle pattern. This is the case modeled in FIG. 11, discussed above. This approach has the advantage of saving photodiode space, and the leakage current associated with each photodiode. It also conserves photons, as a smaller area on the silicon needs to be illuminated with the speckle pattern.

Figure 16:
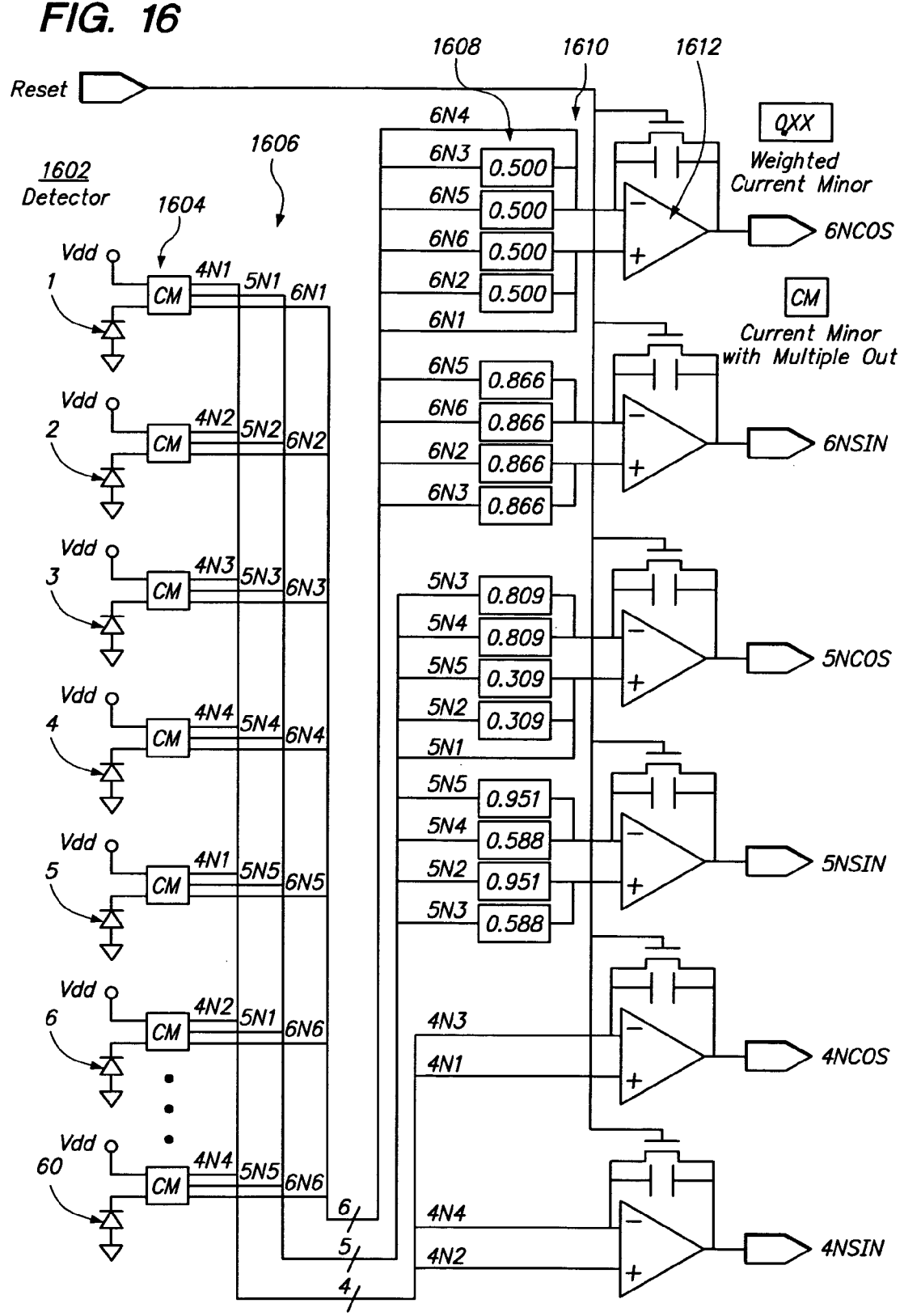
FIG. 16 is a schematic diagram of an embodiment according to an embodiment of the present disclosure of circuitry utilizing current mirrors for implementing 4N/5N/6N weight sets in a way that reuses the same element outputs to generate multiple independent signals for motion estimation.

One circuit implementation to wire individual photodiode elements with multiple values of M is shown in FIG. 16. FIG. 16 is a schematic diagram according to an embodiment of the present invention in which current mirrors are used to implement 4N, 5N, and 6N weight sets in a way that reuses the same element outputs. The circuitry 1600 of FIG. 16 generates multiple independent signals for motion estimation, each independent signal being for a different M configuration. In this example, the output current of each detector or photosensitive element 1602 is duplicated using current mirrors 1604. These outputs are then tied together summing the currents using wiring structures 1606 ordered in accordance with the different M configurations. These wiring structures 1606 add together every Mth output current for the multiple values of M. The magnitude of the weights are then applied by current reducing elements 1608. For each in-phase and quadrature output, further wiring structures 1610 sums currents for the positive weights together and separately sums currents from the negative weights together. Finally, for each in-phase and quadrature output, differential circuitry 1612 receives the separate currents for the positive and negative weights and generates the output signal.

In the particular example shown in FIG. 16, independent in-phase and quadrature outputs are generated for M=4, 5, and 6. In other implementations, in-phase and quadrature outputs may be generated for other values of M. Also, in-phase and quadrature outputs may be generated for more (or fewer) values of M, not just for three values of M per the particular example in FIG. 16.

In an alternate circuit implementation, each detector or photosensitive element can feed multiple current mirrors with different gains to enable the same detector or photosensitive element to contribute to different, independent in-phase and quadrature sums for different detector periods (values of M).

In another alternate circuit implementation, the detector values may be sampled individually or multiplexed and sequentially sampled using analog-to-digital converter (ADC) circuitry, and the digitized values may then be processed to generate the independent sums. In yet another circuit implementation, analog sums of the detector outputs may be processed by a shared time-multiplexed or multiple simultaneous ADC circuitry. There are a number of circuit implementations that could accomplish the task, where the different implementations trade off factors, such as circuit complexity, power consumption, and/or noise figure.

The embodiments shown in FIGS. 5 and 15 show multiple rows of one-dimensional arrays. These rows are connected along their short axis—on top of one another. Alternatively, it may also be useful to have two rows connected along the long axis, as shown in FIG. 17.

Figure 17:
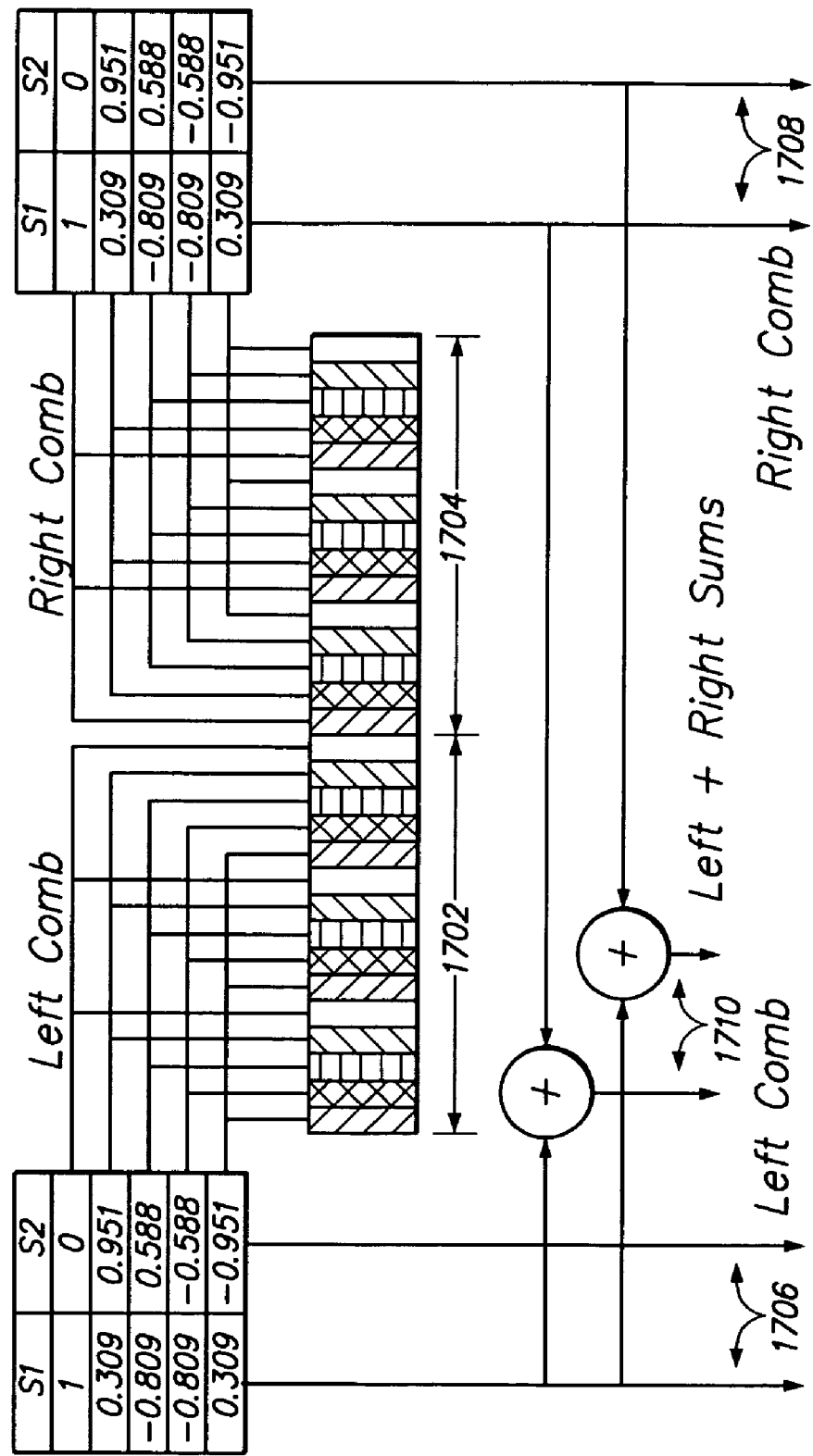
FIG. 17 shows an arrangement of a multi-row array having two rows which are connected end-to-end rather than above and below each other in accordance with an embodiment of the present disclosure.

In FIG. 17, a single one dimensional array is broken up into two parts, a left side 1702 and a right side 1704. Each side may be configured in a comb arrangement having a same value of M. In the particular implementation of FIG. 17, M=5. Other implementations may use other values of M. The left side 1702 generates one set of signals 1706, while the right side 1704 generates a second set of signals 1708. These two sets of signals can optionally be combined into a third set of signals 1710. Thus there are three sets of signals to choose from, based on signal magnitude or the other mechanisms described above. This arrangement has the advantage that the combined set of signals 1710 benefits from an effectively longer array, which should have superior noise properties.

The detailed embodiments described above show the detector or photosensitive element oriented along a single axis—i.e. in a one-dimensional array, albeit possibly with several rows. In another embodiment, the detectors or photosensitive elements are arrayed in two dimensions, as shown, for example, in FIG. 18.

Figure 18:
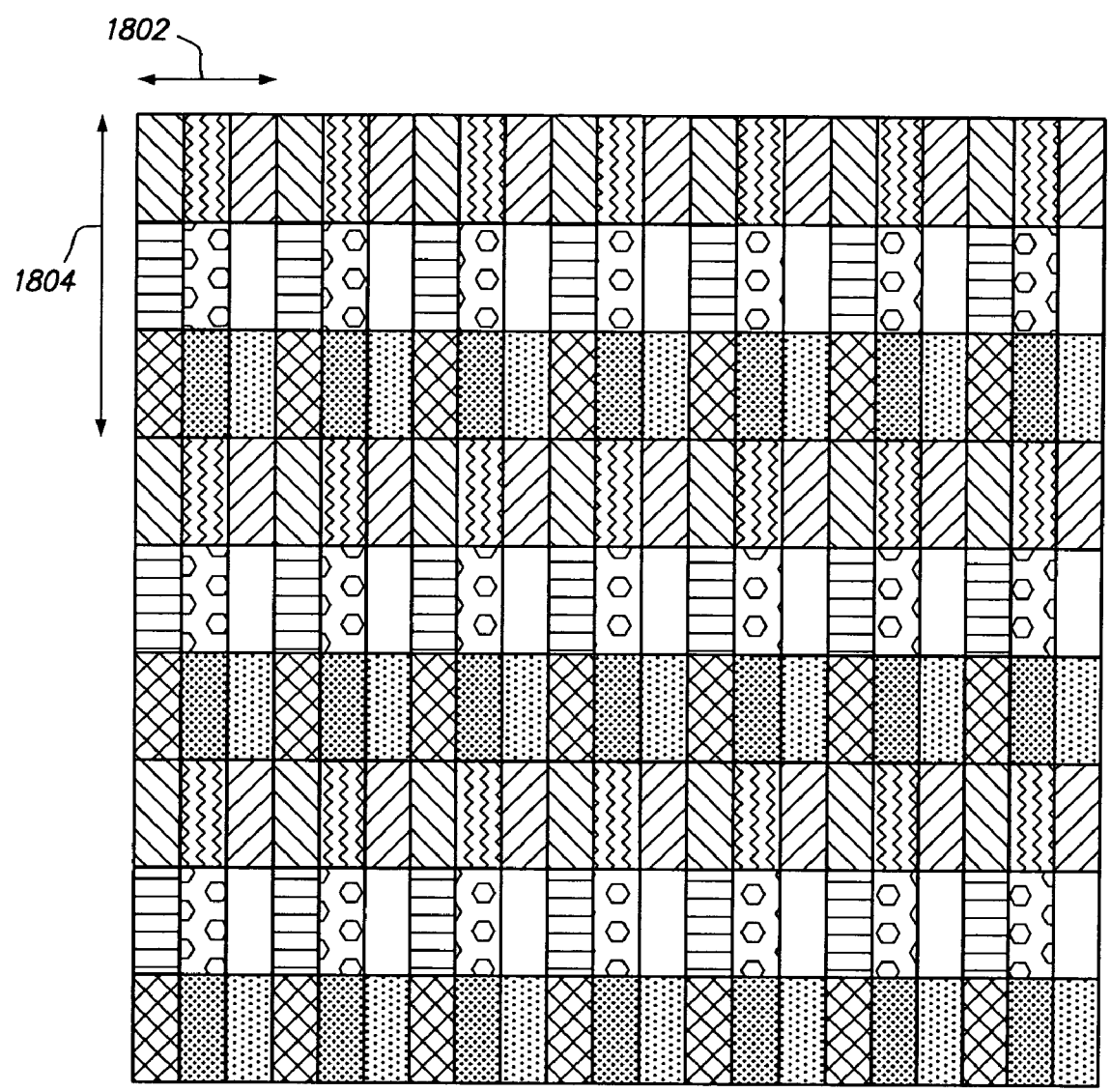
FIG. 18 shows an arrangement of photodetector elements in a two-dimensional array in accordance with an embodiment of the present disclosure.

In FIG. 18, the example two-dimensional (2D) array of 21 by 9 elements is arranged in sets of 9 elements (in a 3×3 matrix). Elements in a given position in a set (shown as having the same color) are grouped together by common wiring. With this configuration, motion information in both x and y can be gathered by the same set of detector or photosensitive elements. While each set is a 3×3 matrix in the example 2D array of FIG. 18, other implementations may have sets of other dimensions. A set may have a different number of elements in the horizontal dimension (x) 1802 than the number of elements in the vertical dimension (y) 1804. Moreover, although the photosensitive elements shown in FIG. 18 are equal in size and rectangular, alternate implementations may use photosensitive elements of different sizes and/or that are not rectangular in shape.

The foregoing description of specific embodiments and examples of the invention have been presented for the purpose of illustration and description, and although the invention has been described and illustrated by certain of the preceding examples, it is not to be construed as being limited thereby. They are not intended to be exhaustive or to limit the invention to the precise forms disclosed, and many modifications, improvements and variations within the scope of the invention are possible in light of the above teaching. It is intended that the scope of the invention encompass the generic area as herein disclosed, and by the claims appended hereto and their equivalents.

What is claimed is:

1. An optical displacement sensor for sensing relative movement between a data input device and a surface by determining displacement of optical features in a succession of images of the surface, the sensor comprising:
    a detector having an array of photosensitive elements;
    multiple sets of the photosensitive elements within the array, each set having a same number M of the photosensitive elements, wherein M is greater than two and not equal to four; and
    summing circuitry configured to add together output signals from corresponding elements in a same relative position within each set so as to produce M group signals from the array.

2. The optical displacement sensor according to claim 1, further comprising:
    combining circuitry configured to generate at least one line signal comprising a linear combination of the group signals.

3. The optical displacement sensor according to claim 2, wherein the combining circuitry generates an in-phase signal and a quadrature signal, and wherein a phase difference between the in-phase and quadrature signals indicates a direction of the relative movement.

4. The optical displacement sensor of claim 2, wherein the combining circuitry includes weighting circuitry to weight the group signals.

5. The optical displacement sensor of claim 4, wherein each group signal is weighted by an in-phase weighting factor (S1) and a quadrature weighting factor (S2).

6. The optical displacement sensor according to claim 5, where the in-phase weighting factor (S1) and the quadrature weighting factor (S2) are calculated using:

$$S1 = \cos\left[\frac{2\pi j}{M} + \phi\right]$$

and $$S2 = \sin\left[\frac{2\pi j}{M} + \phi\right]$$

where j is a number from 0 to M−1 depending upon the group signal being weighted, and $\phi$ is a phase.

7. The optical displacement sensor according to claim 1, wherein M is a number from a set of numbers consisting of three, five and six.

8. The optical displacement sensor according to claim 1, wherein M is at least five.

9. The optical displacement sensor according to claim 1, wherein the array comprises a first linear comb array in which the sets of photosensitive elements are arranged sequentially along a first axis.

10. The optical displacement sensor according to claim 9, further comprising a second linear comb array which comprises sets of photosensitive elements arranged sequentially along a second axis, wherein the second axis is non-parallel to the first axis.

11. The optical displacement sensor according to claim 10, further comprising:
    an illuminator having a coherent light source and illumination optics to illuminate a portion of the surface.

12. The optical displacement sensor according to claim 11, wherein the detector further comprises imaging optics, and wherein the illuminator and the detector are configured to produce on the first and second linear comb arrays an intensity pattern of light reflected from the illuminated portion of the surface, the intensity pattern comprising a plurality of speckles.

13. The optical displacement sensor according to claim 9, wherein the group signals are substantially sinusoidal as the data input device is moved in a direction not perpendicular to the first axis.

14. The optical displacement sensor according to claim 13, wherein a component v of a velocity of movement of the data input device along the first axis is calculated using:

$$v = f^* p / \tau$$

where f is a frame rate, p is a pitch or spacing between two interconnected photosensitive elements in a group, and $\tau$ is a time between a previous two positive-going zero-crossings.

15. A method of sensing movement of a data input device across a surface using an optical displacement sensor having a detector with an array including a number of sets (N) of photosensitive elements, each set having a number of photosensitive elements (M), where M is greater than two (2) and not equal to four (4), the method comprising:

receiving on the array an intensity pattern produced by light reflected from a portion of the surface; and electrically coupling or combining signals from each of the photosensitive elements in a set with corresponding photosensitive elements in a same relative position within other sets to produce a total of M independent group signals.

16. The method according to claim 15, wherein the array comprises a linear comb array, and further comprising combining the group signals to generate at least one line signal from the linear comb array.

17. The method according to claim 16, wherein combining the group signals comprises weighting each group signal prior to combining the group signals to generate the line signal.

18. The method according to claim 17, wherein weighting each group signal comprises multiplying each group signal by an in-phase weighting factor (S1) and a quadrature weighting factor (S2).

19. The method according to claim 18, where weighting factors (S1) and (S2) are calculated using:

$$S1 = \cos\left[\frac{2\pi j}{M} + \phi\right]$$

and $$S2 = \sin\left[\frac{2\pi j}{M} + \phi\right]$$

where j is a number from 0 to M−1 depending upon the group signal being weighted, and φ is a phase.

20. An apparatus configured to sense movement relative to a surface, the apparatus comprising:

an array including M interlaced groups of photosensitive elements, where M is greater than two and not equal to four;

optics configured to map onto the array an intensity pattern produced by light reflected from a portion of the surface; and circuitry for combining signals from each of the photosensitive elements in each group to produce a total of M independent group signals.

* * * * *